United States Patent
Göransson et al.

(10) Patent No.: US 11,226,022 B2
(45) Date of Patent: Jan. 18, 2022

(54) PISTON CYLINDER DEVICE WITH PROTECTION ARRANGEMENT AND METHOD OF PROTECTING A PISTON CYLINDER DEVICE AGAINST OVERLOAD OR FAILURE OF THE PISTON CYLINDER DEVICE

(71) Applicant: Strömholmen AB, Tranås (SE)

(72) Inventors: Fredrik Göransson, Mantorp (SE); Thomas Bergqvist, Tranås (SE)

(73) Assignee: Stromsholmen AB, Tranas (SE)

( * ) Notice: Subject to any disclaimer, the term of this patent is extended or adjusted under 35 U.S.C. 154(b) by 300 days.

(21) Appl. No.: 16/309,225

(22) PCT Filed: Jun. 19, 2017

(86) PCT No.: PCT/EP2017/064885
§ 371 (c)(1),
(2) Date: Dec. 12, 2018

(87) PCT Pub. No.: WO2017/220464
PCT Pub. Date: Dec. 28, 2017

(65) Prior Publication Data
US 2019/0331188 A1    Oct. 31, 2019

(30) Foreign Application Priority Data

Jun. 22, 2016   (SE) .................................... 1650895-4

(51) Int. Cl.
*F16F 9/02*         (2006.01)
*B21D 24/02*      (2006.01)
(Continued)

(52) U.S. Cl.
CPC ............ *F16F 9/0218* (2013.01); *B21D 24/02* (2013.01); *F16F 9/0281* (2013.01);
(Continued)

(58) Field of Classification Search
CPC ...... F16F 9/0218; F16F 9/3214; F16F 9/0281;
F16F 9/58; F16F 9/0236; F16F 9/3242;
F16F 9/362; B21D 24/02
See application file for complete search history.

(56) References Cited

U.S. PATENT DOCUMENTS 6,086,059 A *   7/2000   Runesson ............... F16F 7/123
188/300
8,776,964 B2 *   7/2014   Cappeller ........... F15B 15/1428
188/286
(Continued)

FOREIGN PATENT DOCUMENTS

CN          203272511      11/2013
EP            1053410       7/2002
(Continued)

*Primary Examiner* — Xuan Lan Nguyen
(74) *Attorney, Agent, or Firm* — Ulmer & Berne, LLP; Brian Turung

(57) ABSTRACT

A piston cylinder device (1) comprising a cylinder (2) with a first and a second end and a guide (6), such that a pressure chamber (8) is formed in the cylinder. A piston (12) is moveable in the pressure chamber (8). The guide (6) is fixedly secured to the cylinder (2) by a lock ring (7). A sealing means (9) is arranged to seal between the guide (6) and an inner wall of a tubular wall (3) of the cylinder (2) to prevent fluid leakage from the pressure chamber (8) to the surroundings. The piston cylinder device (1) is provided with a material weakening zone (13) arranged in the inner wall of the tubular wall (3) of the cylinder (2) axially between the lock ring (7) and the second end (20) of the cylinder (2), the material weakening zone (13) being arranged to be deformed or sheared against the lock ring (7) at a predetermined level of impact of the piston (12) against the guide (6). A leakage gap (14) is arranged to interrupt the sealing means (9) upon deformation or shearing of the material weakening zone (13) such that gas from the pres-
(Continued)

sure chamber (8) is allowed to leave the pressure chamber (8) through said leakage gap (14) to the surroundings.

26 Claims, 5 Drawing Sheets

(51) Int. Cl.
*F16F 9/32* (2006.01)
*F16F 9/36* (2006.01)
*F16F 9/58* (2006.01)

(52) U.S. Cl.
CPC .......... *F16F 9/3214* (2013.01); *F16F 9/3242* (2013.01); *F16F 9/362* (2013.01); *F16F 9/58* (2013.01); *F16F 9/0236* (2013.01); *F16F 2230/007* (2013.01); *F16F 2230/0023* (2013.01); *F16F 2230/24* (2013.01); *F16F 2230/30* (2013.01)

(56) References Cited

U.S. PATENT DOCUMENTS

| | | | |
|---|---|---|---|
| 9,593,734 B2 * | 3/2017 | Cappeller | F16F 9/0218 |
| 2003/0110942 A1 | 6/2003 | Wirth et al. | |
| 2004/0089148 A1 | 5/2004 | Johannson et al. | |
| 2012/0042770 A1 | 2/2012 | Cappeller et al. | |
| 2013/0207326 A1 | 8/2013 | Cotter | |
| 2014/0191452 A1 * | 7/2014 | Moss | F16F 9/0218 267/119 |
| 2015/0076753 A1 * | 3/2015 | Cotter | F16F 9/0236 267/124 |
| 2017/0175785 A1 * | 6/2017 | Fiorese | F15B 15/261 |

FOREIGN PATENT DOCUMENTS

| | | |
|---|---|---|
| EP | 2644294 | 2/2013 |
| EP | 2628975 | 8/2013 |
| EP | 2662589 | 11/2013 |
| EP | 2843255 | 4/2015 |
| EP | 2243976 | 9/2015 |

* cited by examiner

PISTON CYLINDER DEVICE WITH PROTECTION ARRANGEMENT AND METHOD OF PROTECTING A PISTON CYLINDER DEVICE AGAINST OVERLOAD OR FAILURE OF THE PISTON CYLINDER DEVICE

TECHNICAL FIELD

The present invention relates to a piston cylinder device provided with a protection arrangement against overload and failure of the piston cylinder device and to a method of protecting a piston cylinder device against overload or failure of the piston cylinder device.

BACKGROUND

When forming products by deep drawing sheet metal, gas springs are used both to hold the metal sheet and to assist in separating tool halves from each other after a forming operation. Since the introduction of gas springs in press tools the production speed has increased considerably. The increased production speed has resulted in a faster pressing operation with higher press rates and less idle time between press cycles to keep the efficiency at a high level. In addition, increased production series has resulted in increased operating lifespan of the press tools. This together with the increased production speed has increased the demands on the press tools and has increased the wear on ingoing tool components. Press tools today manage essentially faster pressing operations than those press tools which were used when gas springs first were introduced in the sheet metal forming industry.

Gas springs which support the sheet metal holder are pre-loaded with 50-200 bar, normally 150 bar, in the beginning of the press cycle and relieved afterwards. During operation the piston is pressed into the gas cylinder, whereupon the gas in the gas chamber in the gas cylinder is compressed and the pressure increases in the gas spring. The extent to which each gas spring is loaded is determined by the press cycle, the form of the pressed product and of the effective stroke length of the gas spring. After the stroke has been carried through, the piston returns to its unloaded initial position and a new compression event is started. This is repeated during the lifespan of the gas spring.

To optimize the forming operation control of the press cycle is required. There is a risk, however, that the press cycle cannot be controlled in a satisfactory manner.

Development of new materials such as e.g. different types of high-strength steel has resulted in a demand for an increased forming force. If the forming force is not high enough, any working tool component fails or something else goes wrong during the forming operation and the press cycle cannot be controlled in a satisfactory manner, there is a risk that the gas spring is damaged or overloaded.

Such errors may cause the piston of the gas spring to get stuck in a compressed position. After being released from such a compressed position the piston freely accelerates in the gas spring, i.e. travels with high speed, in a direction out of the gas spring due to the pressure in the gas spring when the press has returned to the initial position. If this happens, and the piston is released in the compressed state it may travel with an uncontrollable speed and energy. The uncontrollable speed and energy of the piston may cause damage to the parts making up the gas spring, including the cylinder, the piston rod, the piston and the guide, thus leading to reduced length of life, or at worst, rupture. Further, some parts of the gas spring may separate from each other and leave the gas spring with high speed. In these situations, press tools and other types of equipment, components and the surroundings may become damaged if overloading is uncontrolled.

To prevent this, gas springs have been equipped with protection arrangements stopping the piston rod in a controlled manner through a stepwise reduction of its energy and velocity to keep the force on the piston to a minimum during a gas spring device failure. Through this protection, gas may leak from the gas chamber in a controlled manner if the piston rod of the gas spring gets stuck in the compressed state and thereafter is released to freely accelerate in the gas spring.

Examples of different such protection arrangements can be seen in e.g. EP 1053410 B1 and EP 2243976 B1.

The development of higher forming forces and press rates has resulted in increased demands on the gas springs and protection arrangements against uncontrollable speed of the piston rod in the gas spring. Thus, there are demands for gas springs with increased robustness and improved protection against overload or failure of the gas springs.

SUMMARY

It is an object of the present disclosure to provide a piston cylinder device which provides a way to reduce to zero the velocity of a piston rod which is traveling at a high velocity in a piston cylinder during overload or a failure of the piston cylinder device.

The invention is defined by the appended independent claims with embodiments being set forth in the appended dependent claims, in the following description and in the drawings.

According to a first aspect, there is provided a piston cylinder device, comprising a cylinder having a tubular wall, an end wall at a first end of the tubular wall and a guide at a second end of the tubular wall, and the tubular wall, the end wall and the guide forming a pressure chamber there between. A piston is disposed within the pressure chamber and connected to a piston rod, the piston rod extending through the guide and into the pressure chamber, the piston rod being slidable relative to the guide, and the guide being fixedly secured to the cylinder by a lock ring arranged to protrude in a circumferential lock ring groove of an inner wall of the tubular wall of the cylinder and an opposing lock ring groove of and outer wall of the guide. A sealing means is arranged to seal between the guide and the inner wall of the tubular wall to prevent fluid leakage from the pressure chamber to the surroundings. The piston cylinder device is provided with a material weakening zone arranged in the inner wall of the tubular wall of the cylinder axially between the lock ring and the second end of the cylinder, the material weakening zone being arranged to be deformed or sheared against the lock ring at a predetermined level of impact of the piston against the guide. Further, a leakage gap is arranged to interrupt the sealing means upon deformation or shearing of the material weakening zone such that gas from the pressure chamber is allowed to leave the pressure chamber through said leakage gap to the surroundings.

When the piston rod is released from a compressed state and freely accelerates in the cylinder in a direction out of the cylinder the first contact between the piston and other components of the piston cylinder device is when the piston hits the guide when the piston is moving in a direction towards the second end of the cylinder. A contact force is created between the piston and the contact surface of the guide. The force is transferred through the guide towards its contact surface with the cylinder and the lock ring. The lock ring is pushed in the lock ring groove in a direction towards the second end of the cylinder, which groove may be overloaded if there is no protection against free acceleration in the piston cylinder device. Overloading may result in cracking of material in or in connection to the lock ring groove resulting in that piston cylinder device components may be separated from each other and leave the gas spring device with high speed.

To minimize load on the piston cylinder device and its ingoing components and to enable a controlled gas leakage if the piston rod is released from a compressed state and freely accelerates in the piston cylinder, the piston cylinder device is provided with a material weakening zone in the inner wall of the tubular wall of the cylinder axially between the lock ring groove and the second end of the cylinder. Through the contact between the parts of the piston cylinder device during the release of the piston rod the lock ring is pressed into the lock ring groove of the cylinder and the material of the material weakening zone arranged axially between the lock ring and the second end of the cylinder is deformed or sheared. The material weakening zone unloads the lock ring groove of the cylinder such that overloading and cracking of material in or in connection to the lock ring groove is prevented and, hence, piston cylinder device components are not separated from each other and do not leave the gas spring with high speed.

Due to the deformation/shearing of the material of the material weakening zone, the axial position of the guide is displaced towards the second end of the cylinder. Upon the axial movement of the guide, the sealing means becomes interrupted by the leakage gap such that gas from the pressure chamber is allowed to leave the pressure chamber through said leakage gap to the surroundings in a controlled manner. Thereby, the speed of the piston is reduced to zero without any of the piston cylinder parts being separated from each other and leaving the piston cylinder device. The aim of the material weakening zone is that the material thereof should be deformed or sheared against the lock ring such that energy from the released piston rod is absorbed by the material weakening zone. As the sealing means has become interrupted the piston cylinder device is exhausted and gas may not be added accidentally to the device.

The displacement of the axial position of the guide towards the second end of the cylinder due to deformation or shearing of the material in the material weakening zone can be visually seen as a portion of the guide extending past the second end of the cylinder.

If the protection arrangement of the piston cylinder device has been triggered i.e. the material weakening zone has been deformed/sheared, the cylinder is not reusable in another piston cylinder device as the cylinder through the deformation/shearing of the material in the material weakening is damaged.

The material weakening zone is arranged such that the weakening is robust enough to withstand normal operation conditions and weak enough to deform or shear when subject to overload. The material weakening zone may be formed between the lock ring groove and a continuous or discontinuous circumferential groove in the inner wall of the tubular wall of the cylinder.

A discontinuous circumferential groove may be a milled or bored undercut along the circumference.

The radial extension and the shape of the groove controls the material weakening zone such that the weakening is robust enough to withstand normal operation conditions and weak enough to deform or shear when subject to overload.

The axial extension of the groove controls how much the material of material weakening zone may deform or shear before the sealing means becomes interrupted by the leakage gap. The axial extension of the groove should be adapted such that the risk of the lock ring getting stuck in the groove during assembly of the piston cylinder device is minimized.

The sealing means may e.g. be an O-ring.

The sealing means may be axially arranged between the lock ring and the first end of the cylinder.

The sealing means may be arranged in a circumferential groove in the outer wall of the guide.

The sealing means may be arranged in a circumferential groove in the inner wall of the tubular wall of the cylinder.

The leakage gap may be axially arranged between the lock ring and the sealing means.

The sealing means and the leakage gap should be arranged in relation to each other to facilitate interruption of the sealing means by the leakage gap to allow gas from the pressure chamber to leave the pressure chamber through said leakage gap to the surroundings when the axial position of the guide is displaced towards the second end of the cylinder due to the deformation or shearing of the material of the material weakening zone.

The leakage gap may be arranged in the inner wall of the tubular wall of the cylinder. In this case the sealing means is preferably arranged in the outer wall of the guide.

The leakage gap may be arranged in the outer wall of the guide. In this case the sealing means is preferably arranged in the inner wall of the tubular wall of the cylinder.

The leakage gap may be a continuous or discontinuous circumferential groove in the inner wall of the tubular wall of the cylinder The discontinuous circumferential groove may be a milled or bored undercut along the circumference of the inner wall of the tubular wall.

The leakage gap may be integrated with the lock ring groove.

The leakage gap may alternatively be arranged at an axial distance from the lock ring groove.

According to a second aspect there is provided a method of protecting a piston cylinder device against overload comprising a cylinder with a first and second end and a guide such that a pressure chamber is defined in the cylinder, and a piston moveable in the pressure chamber, the method comprising at a predetermined level of impact of the piston against the guide, causing a material weakening zone arranged in an inner wall of a tubular wall of the cylinder to be deformed or sheared, interrupting a sealing means arranged to seal between the guide and the inner wall of the tubular wall upon deformation or shearing of the material weakening zone such that gas from the pressure chamber is allowed to leave the pressure chamber to the surroundings.

BRIEF DESCRIPTION OF THE DRAWINGS

In FIG. 3 the piston rod of the piston cylinder device is shown freely accelerating in the cylinder in a direction X out of the cylinder.

In FIG. 4 the moment of contact between a travelling piston and the guide is shown.

In FIG. 5 deformation/shearing of the material weakening zone against the lock ring is shown.

DETAILED DESCRIPTION

Figure 1:
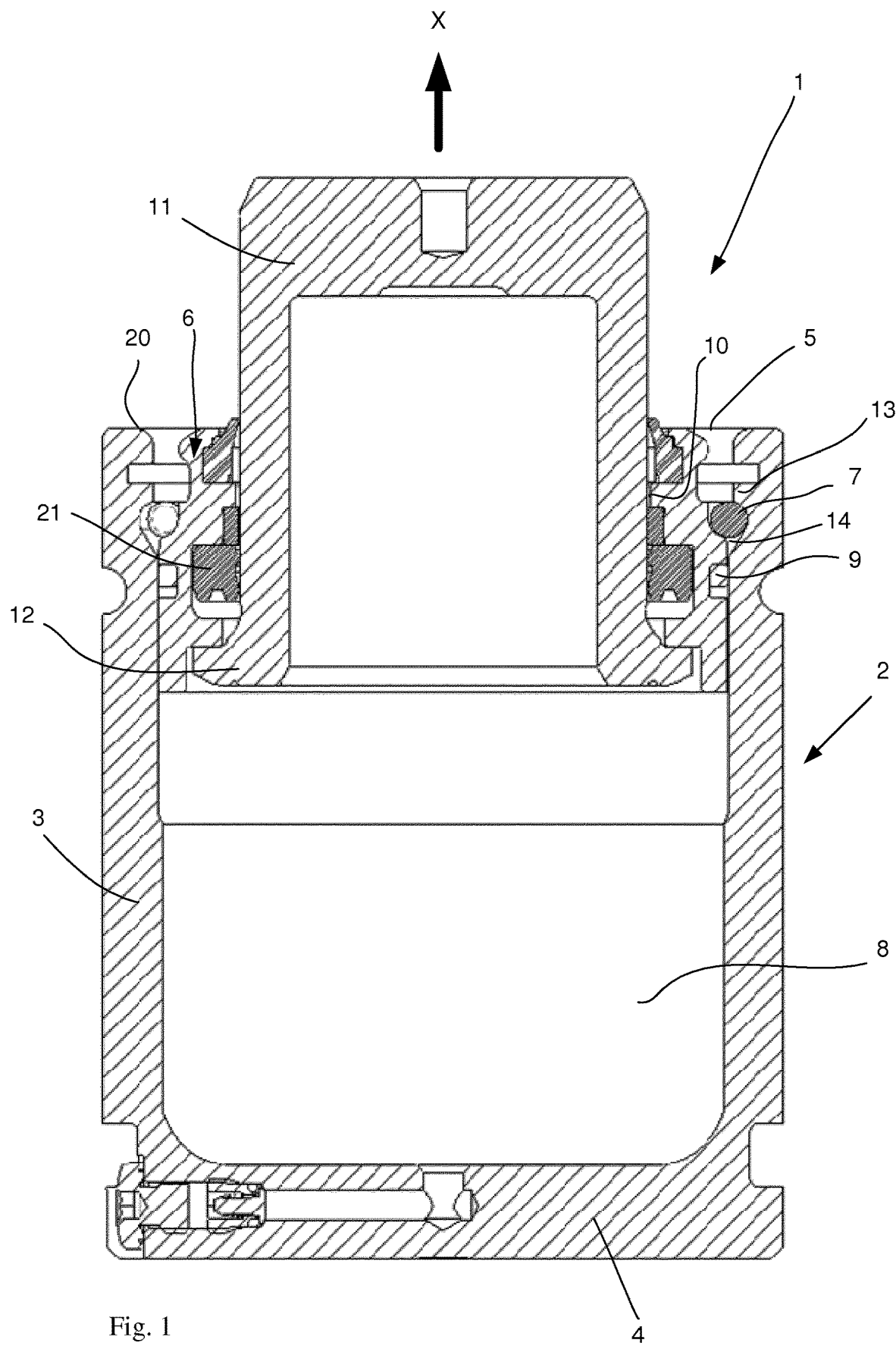
FIG. 1 is a longitudinal cross-sectional view of a piston cylinder device with a material weakening zone arranged in the inner wall of the cylinder.
Figure 2:
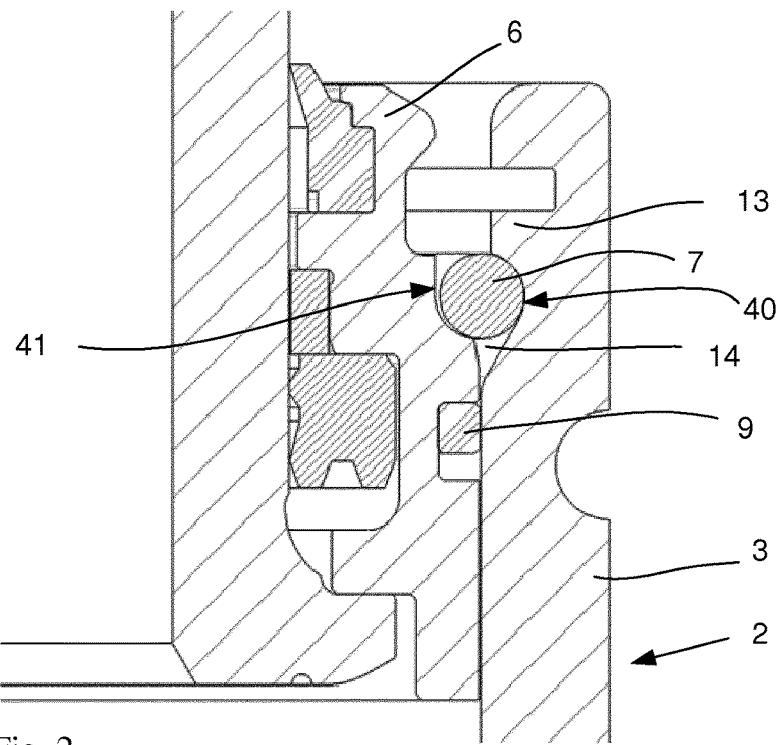
FIGS. 2-5 are magnifications of a portion of the piston cylinder device of FIG. 1.

In FIG. 1 a piston cylinder device 1 is shown. The piston cylinder device comprises a cylinder 2 having a tubular wall 3 with an end wall 4 closing off one end of the tubular wall. The opposite, second end 20 of the tubular wall 3 includes an opening 5, and a piston rod guide 6 is fixedly secured within the opening 5 by a lock ring 7 so as to form a pressure chamber 8 in the cylinder 2. The lock ring 7 is arranged to protrude in a circumferential lock ring groove 40 of the inner wall of the tubular wall 3 of the cylinder 2 and an opposing lock ring groove 41 of an outer wall of the guide 6, see FIG. 2.

The pressure chamber 8 is normally pre-loaded with gas under high pressure, typically in the order of 50-200 bar, normally 150 bar.

Sealing means 9, FIGS. 1-7, is disposed between the inner wall of the tubular wall 2 and the piston rod guide 6 to prevent fluid leakage from the pressure chamber 8 between the outer surface of the guide 6 and the inner wall of the tubular wall to the surroundings. The sealing means 9 may be axially arranged between the lock ring 7 and the first end 4 of the cylinder 2, see FIG. 1. The sealing means 9 may be arranged in a circumferential groove in the outer wall of the guide, FIGS. 1-7. Alternatively, the sealing means 9 may be arranged in a circumferential groove in the inner wall of the tubular wall 3 of the cylinder 2 (not shown).

The guide 6 includes a central opening 10 therethrough, and a piston rod 11 is slidingly received in the opening 10 and extends into the pressure chamber 8. A piston 12 is secured to the end of the piston rod 11 in the pressure chamber 8.

A seal 21 surrounds the piston rod 11 in order to prevent fluid leakage between the piston rod 11 and the guide 6.

The piston cylinder device 1 is provided with a material weakening zone 13 arranged in the inner wall of the tubular wall 3 of the cylinder 2 axially between the lock ring 7 and the second end 4 of the cylinder 2. The material weakening zone 13 is arranged to be deformed or sheared against the lock ring 7, FIG. 5, at a predetermined level of impact of the piston 11 against the guide 6.

A leakage gap 14 is arranged to interrupt the sealing means 9 upon deformation or shearing of the material weakening zone 13 such that gas from the pressure chamber 8 is allowed to leave the pressure chamber 8 through the leakage gap 14 to the surroundings.

Figure 3:
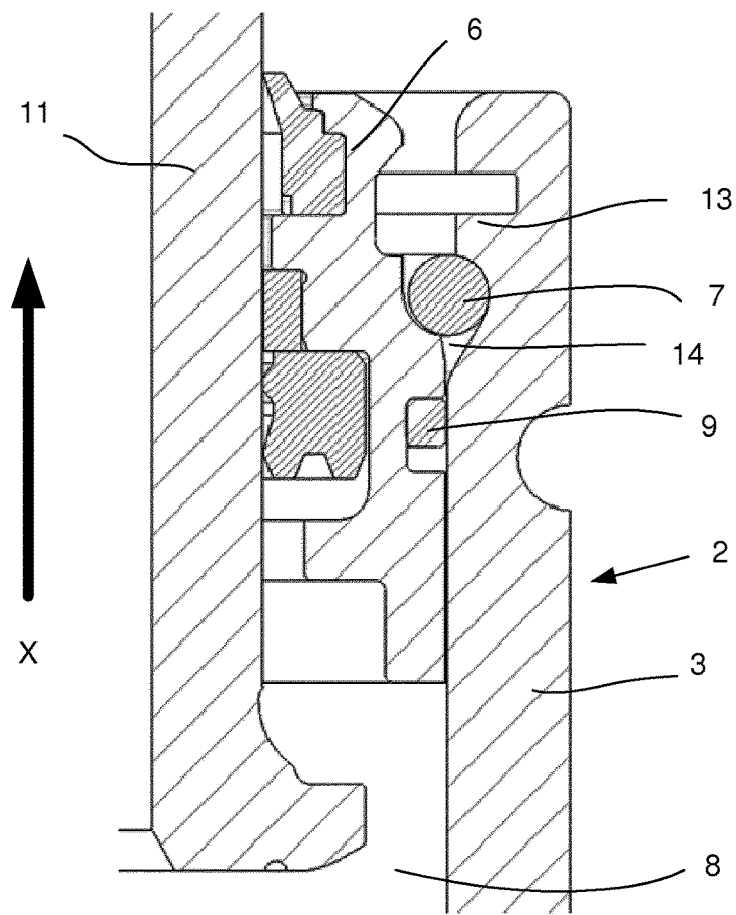

Due to the presence of the material weakening zone 13 in the inner wall of the tubular wall 3 of the cylinder 2 axially between the lock ring groove and the second end of the cylinder 2, the piston cylinder device 1 is designed to stop, in a controlled manner, a piston rod 11 moving with high velocity in a direction out of the cylinder, along arrow X shown in FIGS. 1 and 3, caused by failure of the piston cylinder device 1.

Figure 4:
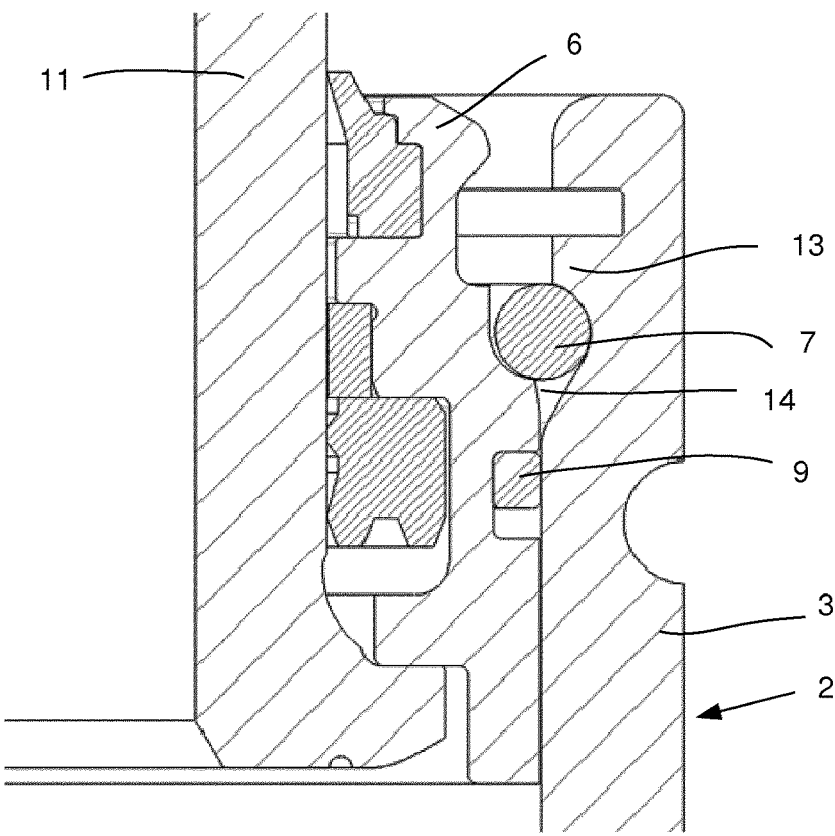
Figure 5:
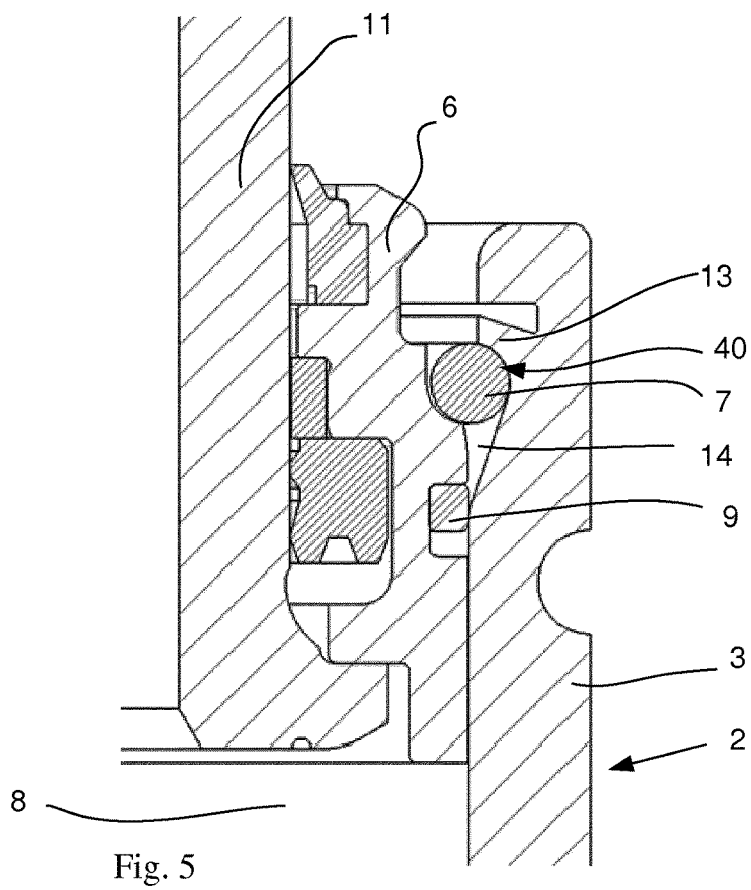

In FIG. 3 the piston rod 11 is shown freely accelerating in the cylinder 2 in a direction X out of the cylinder 2. In FIG. 4 the moment of contact between a travelling piston 12 and the guide 6 is shown. Through the contact between the parts of the piston cylinder device 1 during release of the piston rod 11 from a compressed state due to failure or overload of the piston device the lock ring 7 is pressed into the lock ring groove 40 of the cylinder 2 and the material of the material weakening zone is deformed or sheared, FIG. 5. Thereby the axial position of the guide 6 is displaced towards the second end of the cylinder 2. Upon the axial movement of the guide 6, the sealing means 9 becomes interrupted by the leakage gap 14 such that gas from the pressure chamber 8 is allowed to leave the pressure chamber 8 through the leakage gap 14 to the surroundings. Thereby, the speed of the piston 11 is reduced to zero without any of the piston cylinder device parts being separated from each other and leaving the piston cylinder device. Through the material deformation/shearing of the material of the material weakening zone against the lock ring 7 energy from the released piston rod 11 is absorbed by the material weakening zone 13.

Figure 8:
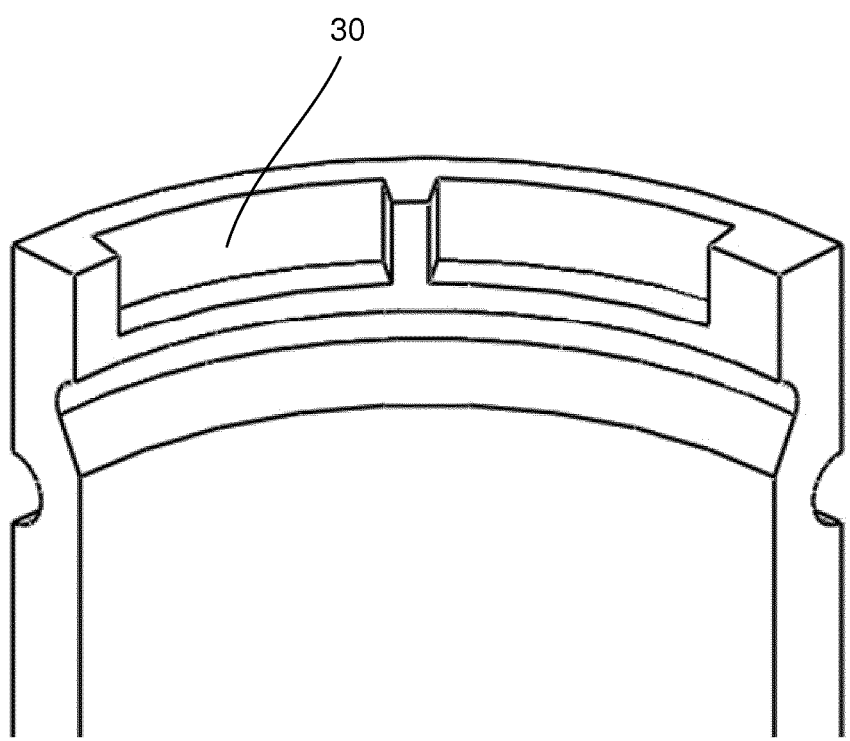
FIG. 8 shows a discontinuous circumferential groove in the inner wall of the tubular wall of the cylinder of the piston cylinder device.

The material weakening zone 13 may be formed between the lock ring groove and a continuous or discontinuous circumferential groove 30 (see FIG. 8) in the inner wall of the tubular wall of the cylinder. In FIG. 8 a discontinuous such groove is shown. A discontinuous circumferential groove may be a milled or bored undercut along the circumference.

The leakage gap 14 may be axially arranged between the lock ring 7 and the sealing means 9 as shown in FIGS. 1-7. Alternatively, the leakage gap may be arranged between the sealing means 9 and the first end 4 of the cylinder 2 (not shown). The leakage gap 14 may be arranged in the inner wall of the tubular wall 3 of the cylinder 2, see FIGS. 2-7. The leakage gap 14 may alternatively be arranged in the outer wall of the guide 6 (not shown).

The leakage gap 14 may be a continuous or discontinuous circumferential groove in the inner wall of the tubular wall 3 of the cylinder 2.

The discontinuous circumferential groove may be a milled or bored undercut along the circumference of the inner wall of the tubular wall.

The leakage gap 14 may be integrated with the lock ring groove, see FIGS. 1-5 and FIG. 7. In the embodiment in FIG. 7 the leakage gap extends longer in the longitudinal direction along the inner wall of the tubular wall than the leakage gap in the embodiments of FIGS. 1-5.

Figure 6:
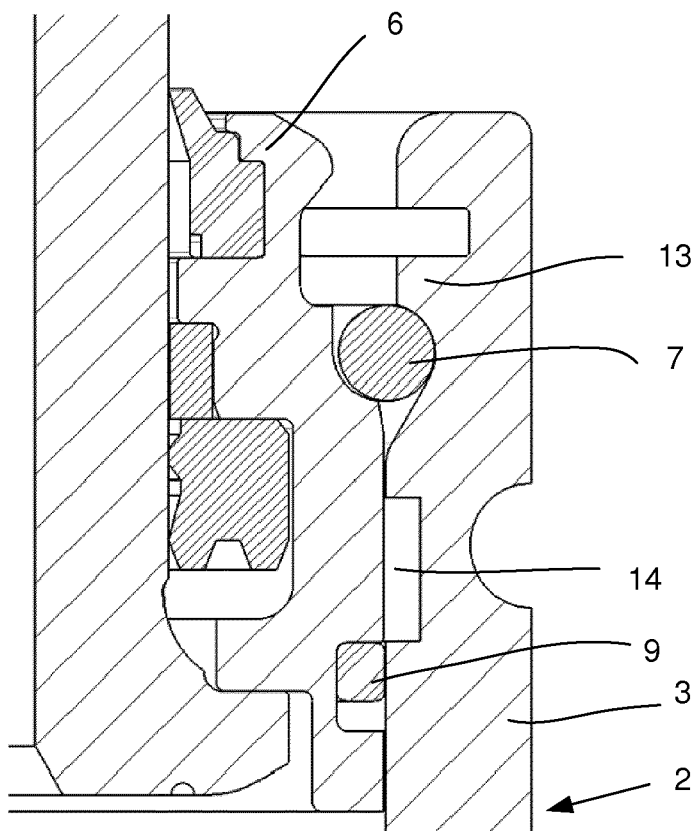
FIG. 6 is a magnification of an alternative embodiment of the piston cylinder device of FIG. 1 with a leakage gap arranged at an axial distance from the lock ring groove.
Figure 7:
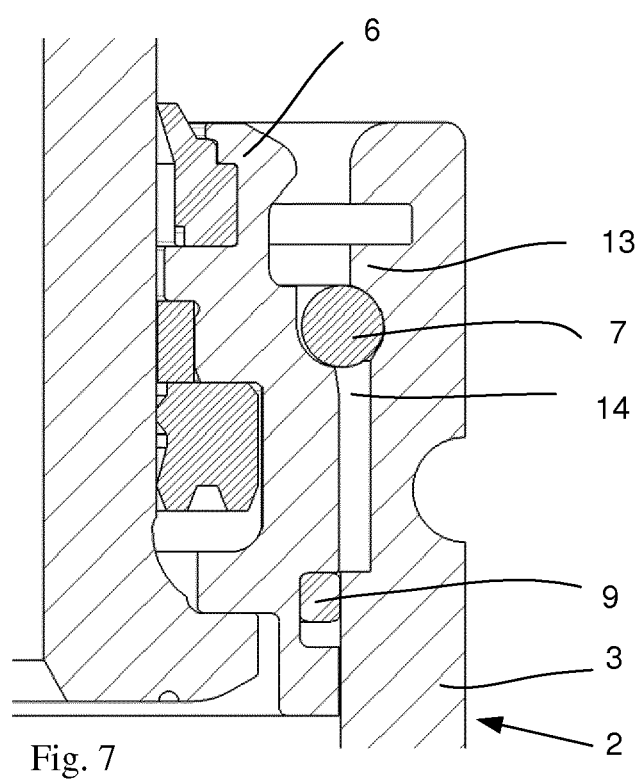
FIG. 7 is a magnification of yet an alternative embodiment of the piston cylinder device of FIG. 1 with a leakage gap integrated with the lock ring groove.

The leakage gap 14 may alternatively be arranged at an axial distance from the lock ring groove, see FIG. 6.

The invention claimed is:

1. A piston cylinder device, comprising:
   a cylinder having a tubular wall, an end wall at a first end of the tubular wall and a guide at a second end of the tubular wall, and said tubular wall, said end wall and said guide form a pressure chamber there between,
   a piston disposed within the pressure chamber and connected to a piston rod, the piston rod extending through the guide and into the pressure chamber, the piston rod being slidable relative to the guide,
   the guide being fixedly secured to the cylinder by a lock ring arranged to protrude in a circumferential lock ring groove of an inner wall of the tubular wall of the cylinder and an opposing lock ring groove of an outer wall of the guide,
   a sealing means arranged to form a seal between the guide and the inner wall of the tubular wall to prevent fluid leakage from the pressure chamber to the surroundings, the piston cylinder device is provided with a material weakening zone arranged in the inner wall of the tubular wall of the cylinder axially between the lock ring and the second end of the cylinder, the material weakening zone at least partially formed of a continuous or discontinuous circumferential groove in the inner wall of the tubular wall of the cylinder, the material weakening zone spaced above the lock ring and the lock ring groove, the material weakening zone being arranged to be deformed or sheared against the lock ring at a predetermined level of impact of the piston against the guide, a bottom portion of the material weakening zone configured to deform or shear in a direction toward the second end of the cylinder upon the predetermined level of impact of the piston against the guide, a leakage gap is arranged to interrupt the sealing means upon deformation or shearing of the material weakening zone such that gas from the pressure chamber is allowed to leave the pressure chamber through said leakage gap to the surroundings.

2. The piston cylinder device of claim 1, wherein the sealing means is axially arranged between the lock ring and the first end of the cylinder.

3. The piston cylinder device of claim 2, wherein the sealing means is arranged in a circumferential groove in the outer wall of the guide.

4. The piston cylinder device of claim 2, wherein the sealing means is arranged in a circumferential groove in the inner wall of the tubular wall of the cylinder.

5. The piston cylinder device of claim 2, wherein the leakage gap is axially arranged between the lock ring and the sealing means.

6. The piston cylinder device of claim 3, wherein the leakage gap is arranged in the inner wall of the tubular wall of the cylinder.

7. The piston cylinder device of claim 4, wherein the leakage gap is arranged in the outer wall of the guide.

8. The piston cylinder device of claim 6, wherein the leakage gap is a continuous or discontinuous circumferential groove in the inner wall of the tubular wall of the cylinder.

9. The piston cylinder device of claim 7, wherein the leakage gap is a continuous or discontinuous circumferential groove in the outer wall of the guide.

10. The piston cylinder device of claim 5, wherein the leakage gap is integrated with the lock ring groove to enable fluid flow from the pressure chamber, through the leakage gap, into the lock ring groove and into the surroundings when the material weakening zone is deformed or sheared.

11. The piston cylinder device of claim 5, wherein the leakage gap is arranged at an axial distance from the lock ring groove.

12. A method of protecting a piston cylinder device against overload, said piston cylinder device comprising a cylinder with a first and second end and a guide such that a pressure chamber is defined in the cylinder, and a piston moveable in the pressure chamber, the guide being fixedly secured to the cylinder by a lock ring arranged to protrude in a circumferential lock ring groove of an inner wall of the cylinder, the method comprising:
at a predetermined level of impact of the piston against the guide,
causing a material weakening zone arranged in an inner wall of a tubular wall of the cylinder to be deformed or sheared upwardly in a direction toward the second end of the cylinder upon a predetermined level of impact of the piston against the guide, and interrupting a sealing means arranged to seal between the guide and the inner wall of the tubular wall upon deformation or shearing of the material weakening zone such that gas from the pressure chamber is allowed to leave the pressure chamber to the surroundings, the material weakening zone is formed between the lock ring groove and a continuous or discontinuous circumferential groove in the inner wall of the tubular wall of the cylinder.

13. A piston cylinder device, comprising:
a cylinder having a side wall, an end wall at a first end of said side wall and a guide at a second end of said side wall, and wherein said side wall, said end wall and said guide form a pressure chamber therebetween;
a piston disposed within said pressure chamber and connected to a piston rod, said piston rod extending through said guide and into said pressure chamber, said piston rod being slidable relative to said guide;
said guide fixedly secured to said cylinder by a lock ring arranged to be at least partially positioned in a lock ring groove, said locking ring groove at least partially formed in an inner wall of said side wall of said cylinder;
a seal positioned between said guide and said inner wall of said side wall to inhibit or prevent fluid leakage from said pressure chamber;
a material weakening zone positioned between said lock ring and said second end of said cylinder, said material weakening zone arranged in said inner wall of said side wall of said cylinder, said material weakening zone spaced above said lock ring and said lock ring groove, said material weakening zone at least partially formed of a continuous or discontinuous circumferential groove in said inner wall of said side wall of said cylinder, at least a portion of said material weaken zone configured to deform or shear in a direction toward said second end of said cylinder at a predetermined level of impact of said piston against said guide when said piston is moving axially upward in said cylinder; and,
a leakage gap configured to allow fluid to circumvent the seal when the material weakening zone deforms or shears.

14. The piston cylinder device as defined in claim 13, wherein said material weakening zone is at least partially formed of a discontinuous circumferential groove in the inner wall of the tubular wall of the cylinder.

15. The piston cylinder device as defined in claim 13, wherein said material weakening zone is configured to inhibit or prevent fracturing apart of an outer wall of said side wall of said cylinder.

16. The piston cylinder device as defined in claim 14, wherein said material weakening zone is configured to inhibit or prevent fracturing apart of an outer wall of said side wall of said cylinder.

17. A method of protecting a piston cylinder device against overload comprising:
providing said piston cylinder device, said piston cylinder device comprising:
a cylinder having a side wall, an end wall at a first end of said side wall and a guide at a second end of said side wall, and wherein said side wall, said end wall and said guide form a pressure chamber therebetween;
a piston disposed within said pressure chamber and connected to a piston rod, said piston rod extending through said guide and into said pressure chamber, said piston rod being slidable relative to said guide;

said guide fixedly secured to said cylinder by a lock ring arranged to be at least partially positioned in a lock ring groove, said locking ring groove at least partially formed in an inner wall of said side wall of said cylinder;

a seal positioned between said guide and said inner al of said side wall to inhibit or prevent fluid leakage from said pressure chamber;

a material weakening zone positioned between said lock ring and said second end of said cylinder, said material weakening zone arranged in said inner wall of said side wall of said cylinder, said material weakening zone spaced above said lock ring and said lock ring groove, said material weakening zone at least partially formed of a continuous or discontinuous circumferential groove in said inner wall of said side all of said cylinder, at least a portion of said material weaken zone configured to deform or shear in a direction toward said second end of said cylinder at a predetermined level of impact of said piston against said guide when said piston is moving axially upward in said cylinder; and, a leakage gap configured to allow fluid to circumvent the seal when the material weakening zone deforms or shears;

causing said piston to impact against said guide at a predetermined level of impact thereby causing said material weakening zone to deform or shear, and thereby causing fluid to flow into said leakage gap and bypass said seal to reduce pressure in said pressure chamber.

18. The method as defined in claim 17, wherein said material weakening zone is at least partially formed of a discontinuous circumferential groove in the inner wall of the tubular wall of the cylinder.

19. The method as defined in claim 17, wherein the leakage gap is integrated with said lock ring groove, and wherein the gas flows from said pressure chamber, through said leakage gap, and into said lock ring groove when the material weakening zone being deformed or sheared.

20. The method as defined in claim 18, wherein the leakage gap is integrated with said lock ring groove, and wherein the gas flows from said pressure chamber, through said leakage gap, and into said lock ring groove when the material weakening zone being deformed or sheared.

21. The method as defined in claim 17, wherein said material weakening zone is configured to inhibit or prevent fracturing apart of an outer wall of said side wall of said cylinder.

22. The method as defined in claim 20, wherein said material weakening zone is configured to inhibit or prevent fracturing apart of an outer wall of said side wall of said cylinder.

23. The piston cylinder device of claim 1, wherein the material weakening zone is at least partially formed of a discontinuous circumferential groove in the inner wall of the tubular wall of the cylinder.

24. The method of claim 12, wherein the leakage gap is integrated with the lock ring groove, and wherein the gas flows from the pressure chamber, through the leakage gap, into the lock ring groove and into the surroundings when the material weakening zone being is deformed or sheared.

25. The piston cylinder device as defined in claim 13, wherein said leakage gap is integrated with said lock ring groove to enable fluid flow from said pressure chamber, through said leakage gap, and into said lock ring groove when said material weakening zone is deformed or sheared.

26. The piston cylinder device as defined in claim 16, wherein said leakage gap is integrated with said lock ring groove to enable fluid flow from said pressure chamber, through said leakage gap, and into said lock ring groove when said material weakening zone is deformed or sheared.

* * * * *